(12) United States Patent
Yang

(10) Patent No.: US 7,540,466 B2
(45) Date of Patent: Jun. 2, 2009

(54) ADJUSTABLE STAND FOR ELECTRONIC DEVICES

(75) Inventor: Ching-Hsien Yang, Taipei (TW)

(73) Assignee: Inventec Multimedia & Telecom (Tianjin) Co., Ltd. (CN)

( * ) Notice: Subject to any disclaimer, the term of this patent is extended or adjusted under 35 U.S.C. 154(b) by 160 days.

(21) Appl. No.: 11/826,602

(22) Filed: Jul. 17, 2007

(65) Prior Publication Data

US 2009/0020660 A1    Jan. 22, 2009

(51) Int. Cl.
*A47G 29/00* (2006.01)
*F16M 11/00* (2006.01)

(52) U.S. Cl. .................. 248/688; 248/126; 248/918; 248/447; 248/460

(58) Field of Classification Search ............ 248/688, 248/126, 292.12, 292.13, 673, 163.1, 434, 248/439, 169, 171, 440.1, 296.1, 297.31, 248/292.14, 919–923, 447, 454, 457, 460, 248/463; 361/680, 681, 688, 683; 403/93, 403/96, 97; 16/329, 330
See application file for complete search history.

(56) References Cited

U.S. PATENT DOCUMENTS

| | | | | |
|---|---|---|---|---|
| 2,808,219 A | * | 10/1957 | Petrick | 248/126 |
| 2,834,149 A | * | 5/1958 | Hunter et al. | 248/445 |
| 3,952,989 A | * | 4/1976 | Bannister Hatcher | 248/453 |
| 4,483,505 A | * | 11/1984 | Dalbo | 248/447 |
| 4,708,239 A | * | 11/1987 | Bourbon | 206/45.23 |
| 6,056,248 A | * | 5/2000 | Ma | 248/124.1 |
| 6,431,511 B1 | * | 8/2002 | Pfister | 248/274.1 |
| 7,384,019 B2 | * | 6/2008 | Choi | 248/136 |

* cited by examiner

*Primary Examiner*—Gwendolyn Baxter
(74) *Attorney, Agent, or Firm*—Bacon & Thomas, PLLC

(57) ABSTRACT

An adjustable stand for electronic devices mainly adapted to eliminate limitation on viewing angle adjustment of conventional adjustable stands is provided. The adjustable stand includes a main body, a first support frame, a second support frame, a pivot, and a sleeve. The pivot passes through and positions each of the components. A pressing portion on the pivot is used to operate the pivot and controls the movement of the pivot. Thus, a supporting angle of the first support frame and the second frame can be adjusted freely to create various viewing angles, such that the viewing angle adjustment can be adapted for different conditions and requirements diversely.

7 Claims, 13 Drawing Sheets

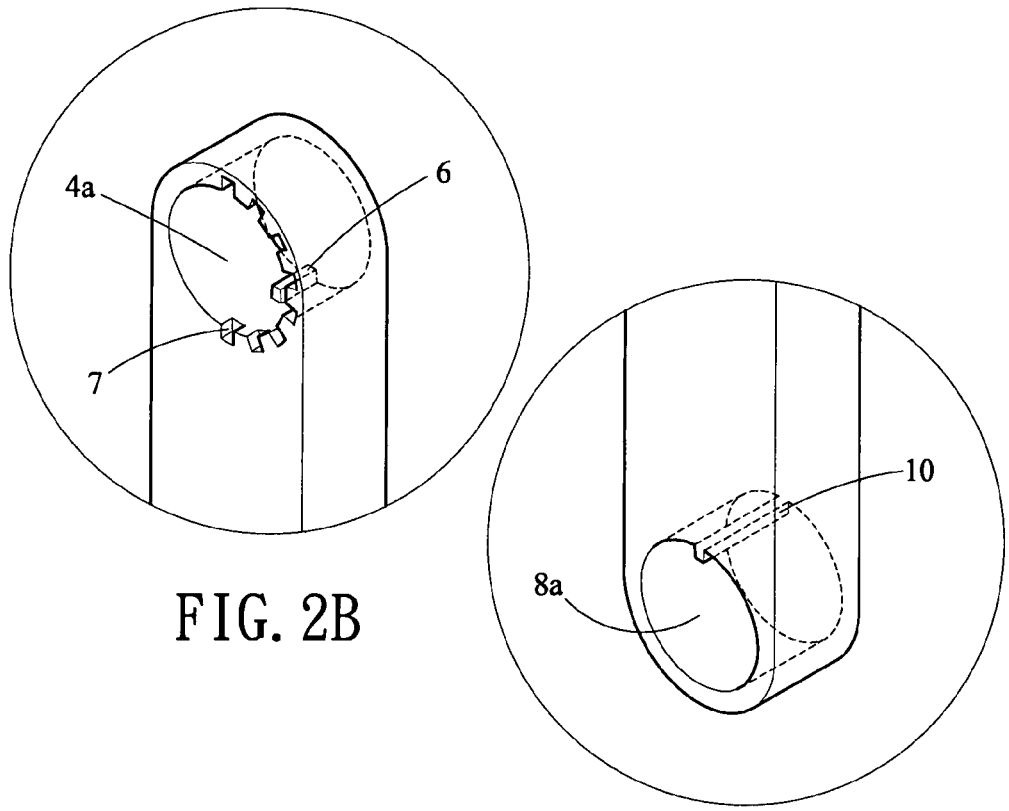
FIG. 2B
FIG. 2C
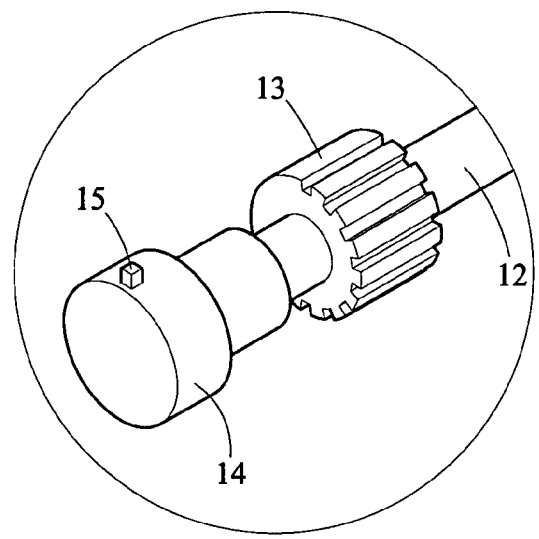
FIG. 2D

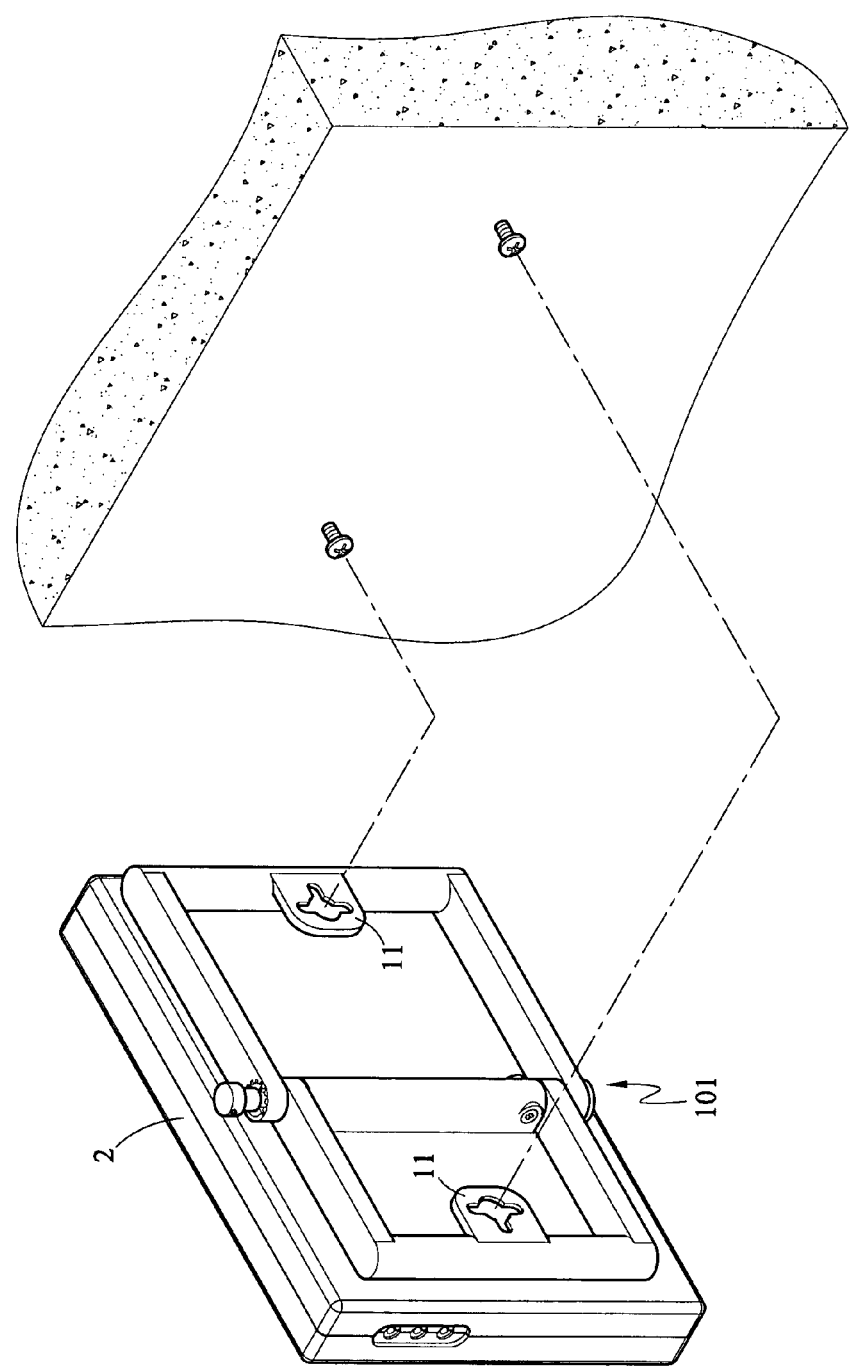

ADJUSTABLE STAND FOR ELECTRONIC DEVICES

BACKGROUND OF THE INVENTION

1. Field of Invention

The present invention relates to a support device, and more particularly to an adjustable stand for electronic devices.

2. Related Art

With the rapid development of electronic technology, almost everyone has one or more electronic devices, for example, indoor telephones, TV-sets, computer screens, and so on. Most of the electronic devices have stands for placement. In the conventional art, a conventional stand for handheld electronic devices is usually a fixed stand, which is improved to an adjustable stand to overcome the disadvantage that the stand cannot be adjusted. However, a conventional adjustable stand usually has one set of supporting structure to provide support. Therefore, though a user can adjust the angle of the stand, limitations on the viewing angle adjustment still exist.

In order to meet the requirements of consumers, more and more electronic devices are being improved, and many new designs have been put forward. Due to the limitations on the space and different functions in use, the requirement on the viewing angle is becoming diverse and complicated, and the stand formed by a single support structure cannot have corresponding changes to overcome the above limitations.

In view of the above problems, the improvements to the adjustable stand is required to be more convenient to meet different requirements of users or eliminate limitations on the space, and the supporting angle of the stand can be adjusted freely, so as to meet the requirements on the viewing angle of the users.

SUMMARY OF THE INVENTION

Accordingly, an adjustable stand for electronic devices, including a main body, a hollow protrusion, a first support frame, a second support frame, a sleeve, and a pivot is provided in the present invention. The pivot further includes a gear portion and a pressing portion, and a limiting bump is disposed on the pressing portion. The pivot passes through and positions each of the components. When a force is exerted on the pressing portion, the pivot will move among the hollow protrusion and holes in the first support frame and the second support frame horizontally. At this time, a user can change the supporting angle of the first support frame and the second support frame freely. Then, when the exerted force is released, the gear portion and the limiting bump urge and fix the first support frame and the second support frame, so as to retain the first support frame and the second support frame at the required positions. According to the present invention, the user can adjust and create various viewing angles freely, so that the viewing angle adjustment can be adapted to different conditions and requirements universally.

In order to make the aforementioned and other objects, features and advantages of the present invention comprehensible, a preferred embodiment accompanied with figures is described in detail below.

BRIEF DESCRIPTION OF THE DRAWINGS

FIG. 2B is a detailed structural view of the adjustable stand of the present invention.

FIG. 2C is a detailed structural view of the adjustable stand of the present invention.

FIG. 2D is a detailed structural view of the adjustable stand of the present invention.

FIG. 6F is a schematic view of the adjustable stand of the present invention using the three-directional hook to be transversely hanging on the wall.

DETAILED DESCRIPTION OF THE INVENTION

Figure 1:
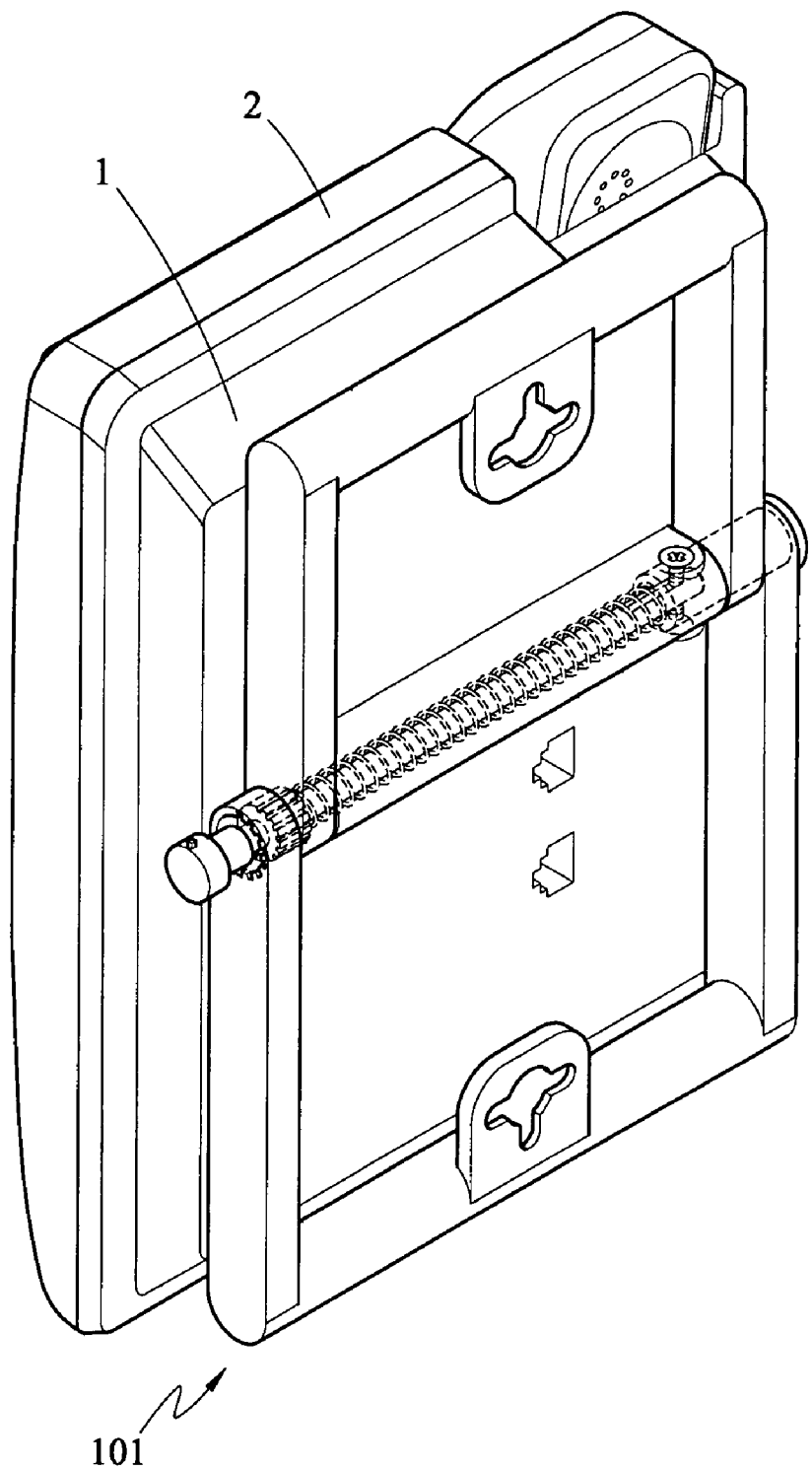
FIG. 1 is a perspective view of the present invention.

FIG. 1 shows an adjustable stand 101 for electronic devices 2 of the present invention, which includes a main body 1. The main body 1 is normally arranged at the bottom of the electronic device 2, so as to form a hollow protrusion 3. Holes are opened at both ends of the hollow protrusion 3.

Figure 2A:
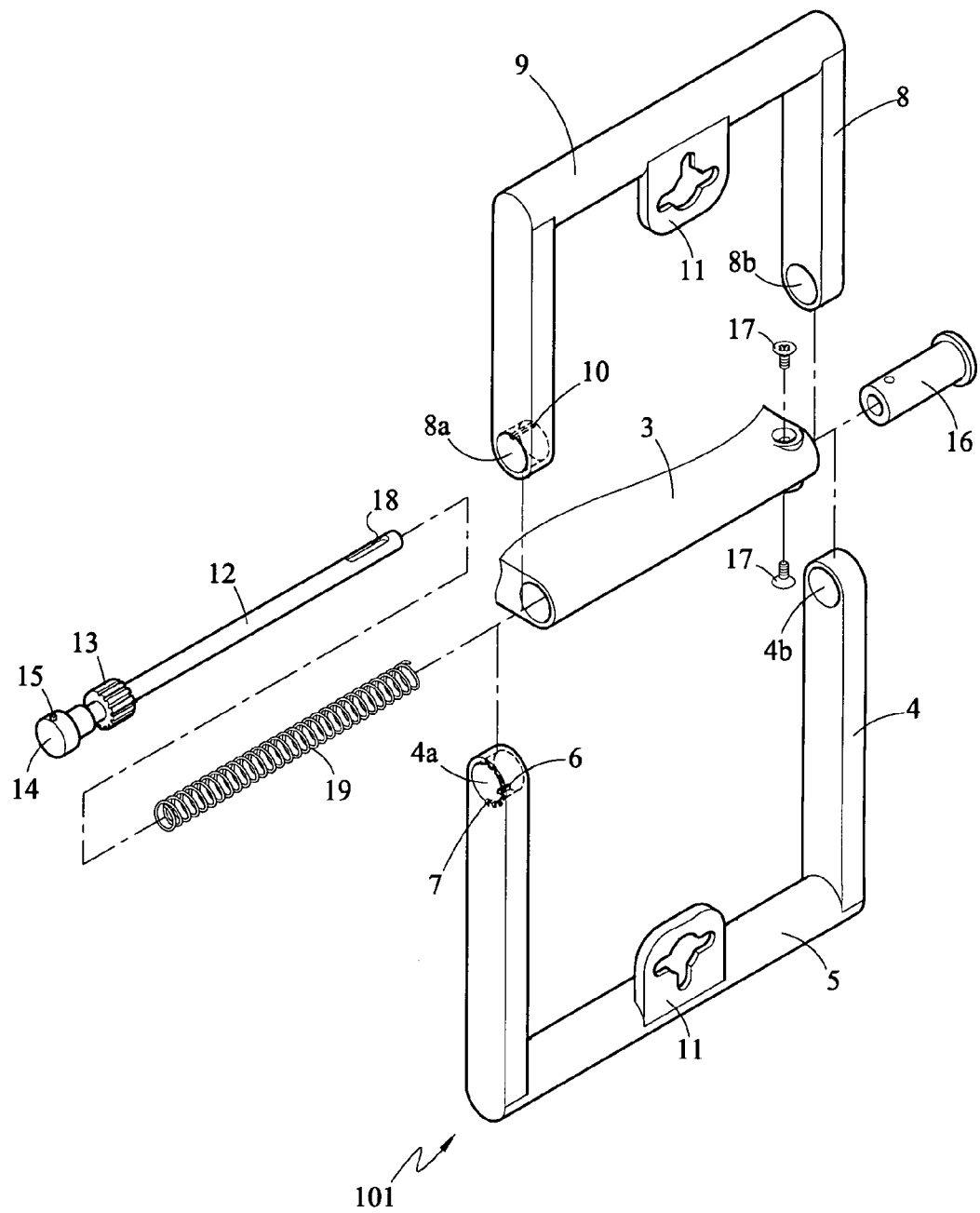
FIG. 2A is an exploded view of an adjustable stand of the present invention.

The detailed structure of the present invention is as shown in FIG. 2. A first support frame 4 has a first support portion 5 formed at a top end. Holes 4a and 4b are opened on supporting surfaces extending from two sides of the first support portion 5. A first convex tooth 6 is formed on the inner periphery of the hole 4a, and at least one limiting slot 7 is formed in the outer surface of the first convex tooth 6. The detailed structure is as shown in FIG. 2B. The second support frame 8 is disposed opposite to the first support frame 4, and a second support portion 9 is formed at a top end of the second support frame 8. Holes 8a and 8b are opened in two sides extending from the second support portion 9. A second convex tooth 10 is formed on the inner periphery of the hole 8a at the same end of the first support frame 4. The detailed structure is as shown in FIG. 2C. The first support frame 4 and the second support frame 8 can be, but not limited to, hollow frames. The first support portion 5 or the second support portion 9 or both can include a three-directional hook 11, such that the user can hang the electronic device for different purposes in use.

A pivot 12 has a gear portion 13 formed at one end thereof. The gear portion 13 extends outward to form a pressing portion 14, and a limiting bump 15 is disposed on the pressing portion 14. The detailed connections and structure are shown in FIG. 2D. The other end of the pivot 12 passes through the holes at one side of the first support frame 4, the second support frame 8, and the hollow protrusion 3, and is pivoted to the first support frame 4 and the second support frame 8. When a force is exerted on the pressing portion 14, the gear portion 13 and the limiting bump 15 are driven to move between the first convex tooth 6 and the second convex tooth 10 movably and horizontally. When the limiting bump 15 urges the limiting slot 7, the gear portion 13 will be disengaged from the first convex tooth 6 and the second convex tooth 10.

Figure 3A:
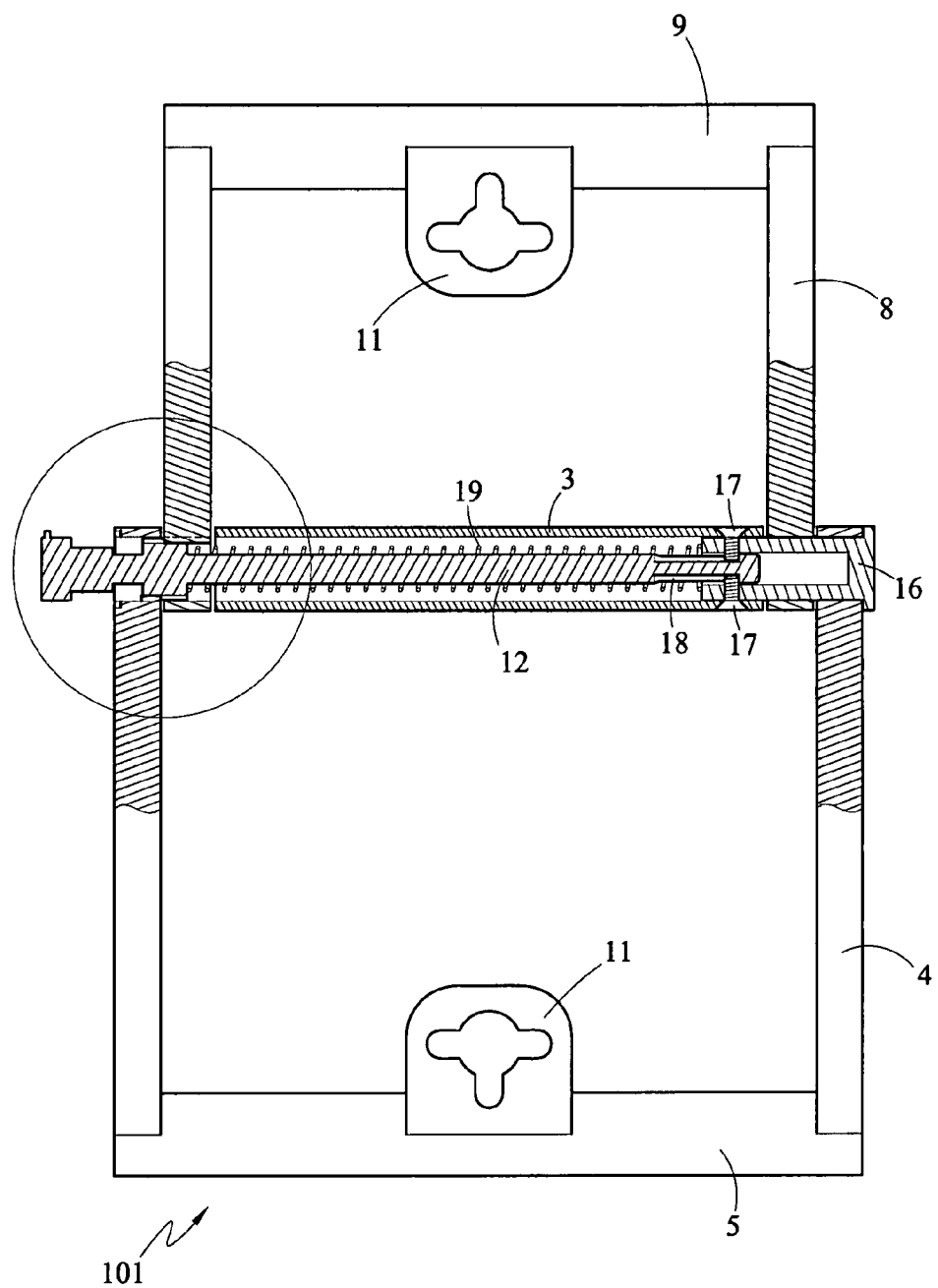
FIG. 3A is a sectional view of the adjustable stand of the present invention in a first state.

A sleeve 16 is inserted in the first support frame 4, the second support frame 8, and the hollow protrusion 3 from the hole at the other side opposite to the pivot 12, and is pivoted to the first support frame 4 and the second support frame 8. The sleeve 16 is inserted in and connected to the hollow protrusion 3 with more than one screws 17, so as to fix the first support frame 4, the second support frame 8, the hollow protrusion 6, and the sleeve 16 of the device. The detailed connections and structure are shown in FIG. 3A. A sliding slot 18 is further disposed at the end of the pivot 12, which matches the more than one screws 17.

When a force is exerted on the pressing portion 13, the sliding slot 18 will move relative to the screw 17, so as to adjust the rotation angle of the first support frame 4 and the second support frame 8. A spring 19 is further sleeved on the pivot 12 of the device. When the force exerted on the pressing portion 14 is released, the pressing portion 14 can restore its original position automatically by the restoring force of the spring 19.

Figure 3B:
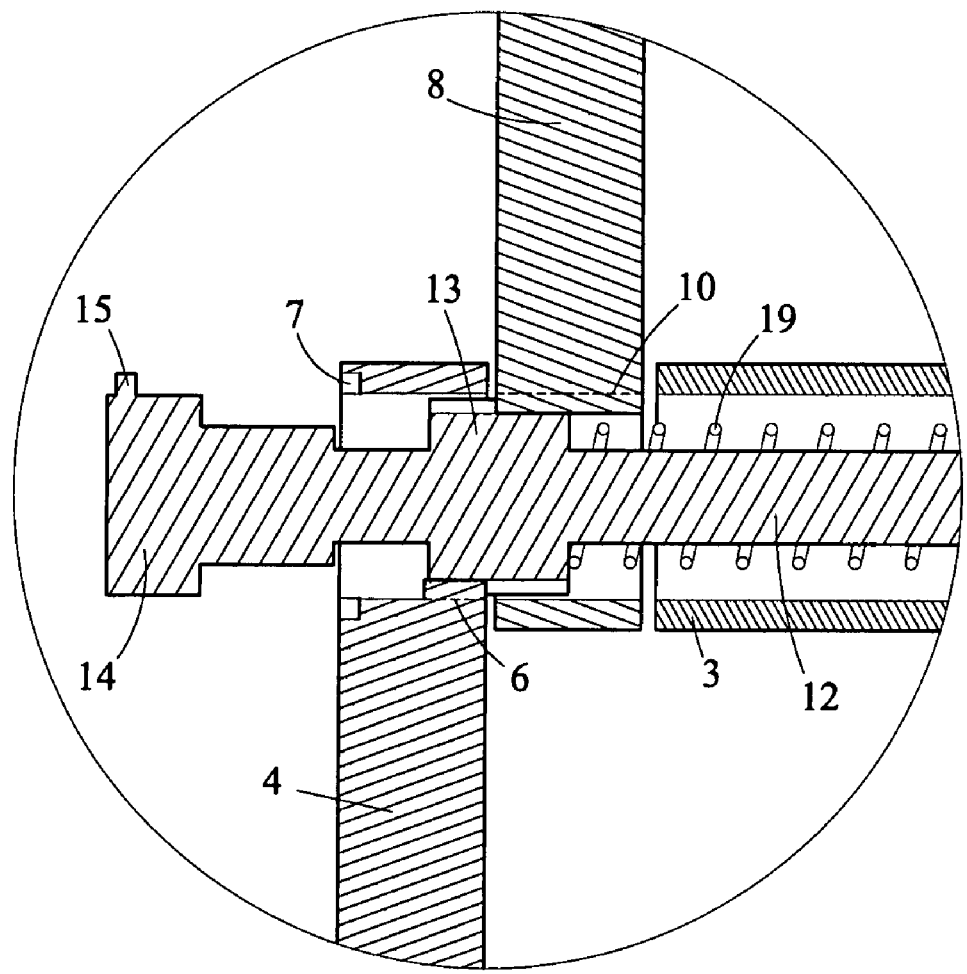
FIG. 3B is a partial enlarged view of the adjustable stand of FIG. 3A.

Then, the detailed operating mode of the adjustable stand 101 of the present invention is further described. FIG. 3A is a sectional view of a first state of the present invention. At this time, no external force is exerted on the pressing portion 14. In this state, the pivot 12 remains at the original state due to the restoring force of the spring 19 exerted on the pivot 12. Thus, the screw 17 urges the right-most end of the sliding slot 18, and limits the movement of the sliding slot 18, such that the position of the pivot 12 is limited. FIG. 3B is a schematic enlarged view of the relationship of relative positions of the pivot 12, the gear portion 13, the limiting bump 15 and the first convex tooth 6, the second convex tooth 10, and the limiting slot 7 in the state shown in FIG. 3A. That is, when no force is exerted on the pressing portion 14, the gear portion 13 will be engaged with the first convex tooth 6 and the second convex tooth 10 at the same time, so as to fix the first support frame 4 and the second support frame 8 at the same time, and the adjustment cannot be made at this time.

Figure 4A:
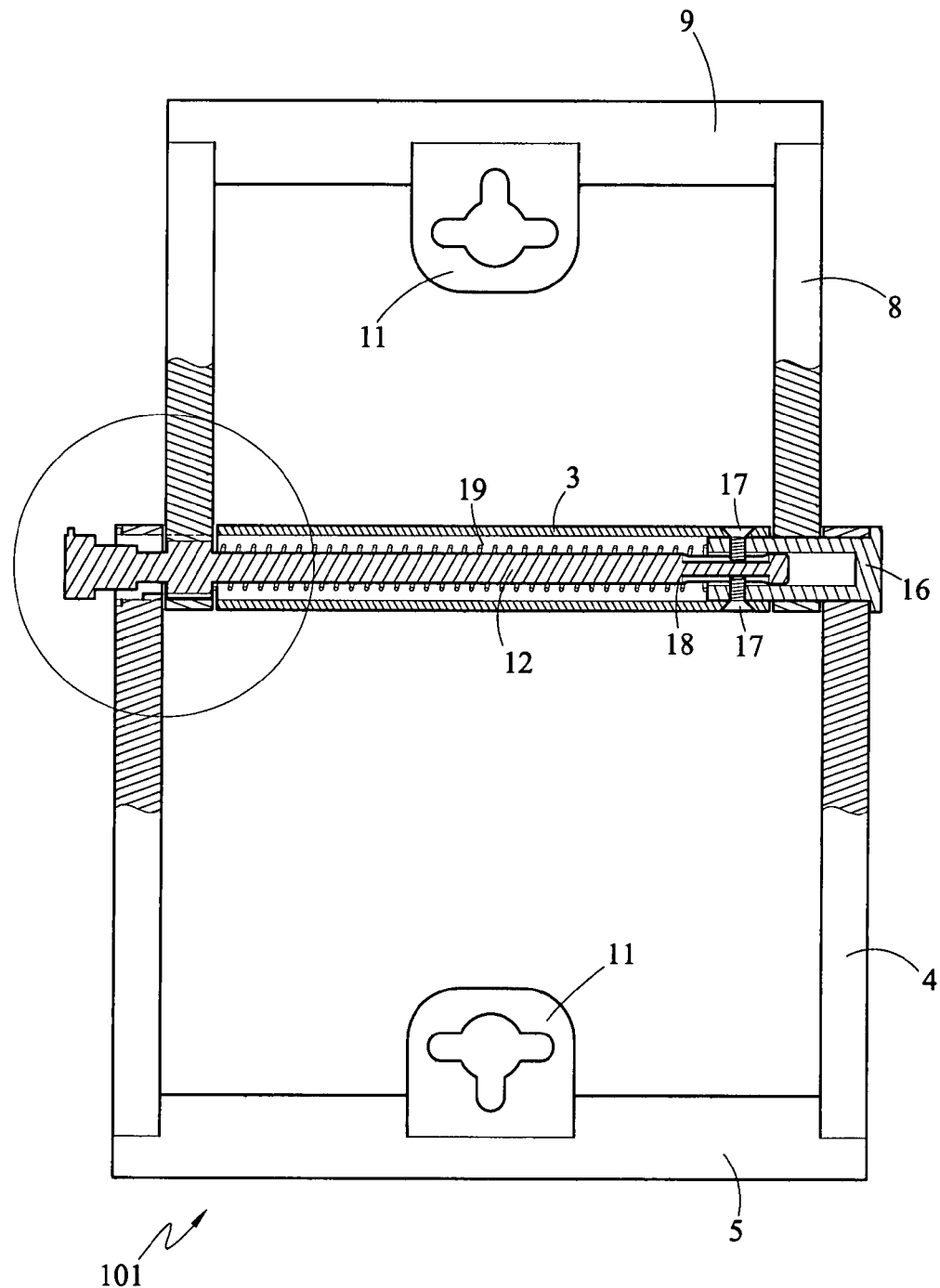
FIG. 4A is a sectional view of the adjustable stand of the present invention in a second state.
Figure 4B:
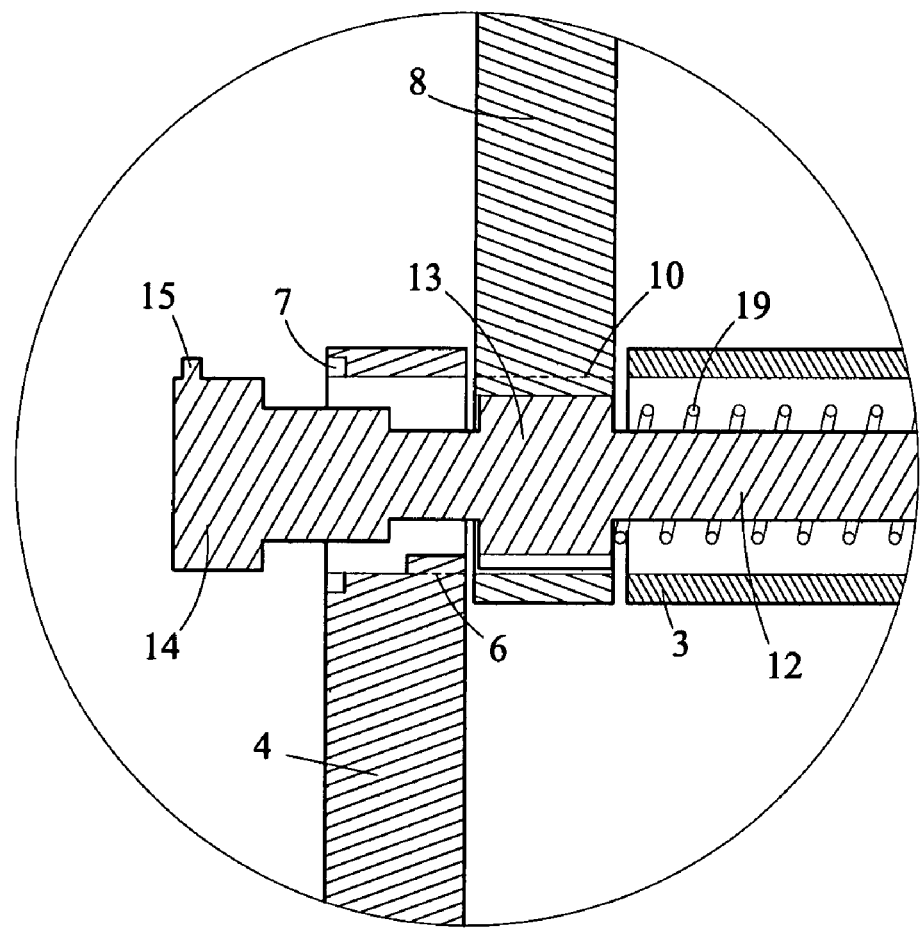
FIG. 4B is a partial enlarged view of the adjustable stand of FIG. 4A.

FIG. 4A is a sectional view of a second state of the present invention. At this time, the pressing portion 14 is endured an external force. In this state, the pivot 12 and the sliding slot 18 thereon are influenced by the external force and move to the right, such that the pivot 12 is pushed into an accommodation space included in the sleeve 16. FIG. 4B is a schematic enlarged view of the relationship of relative positions of the pivot 12, the gear portion 13, the limiting bump 15 and the first convex tooth 6, the second convex tooth 10, and the limiting slot 7 at this time. When the external force is exerted on the pressing portion 14, the pivot 12 moves horizontally, such that the gear portion 13 is disengaged from the first convex tooth 6 and engaged with the second convex tooth 10. At this time, the second support frame 8 can be fixed, and the first support frame 4 can be rotated at the same time.

Figure 5A:
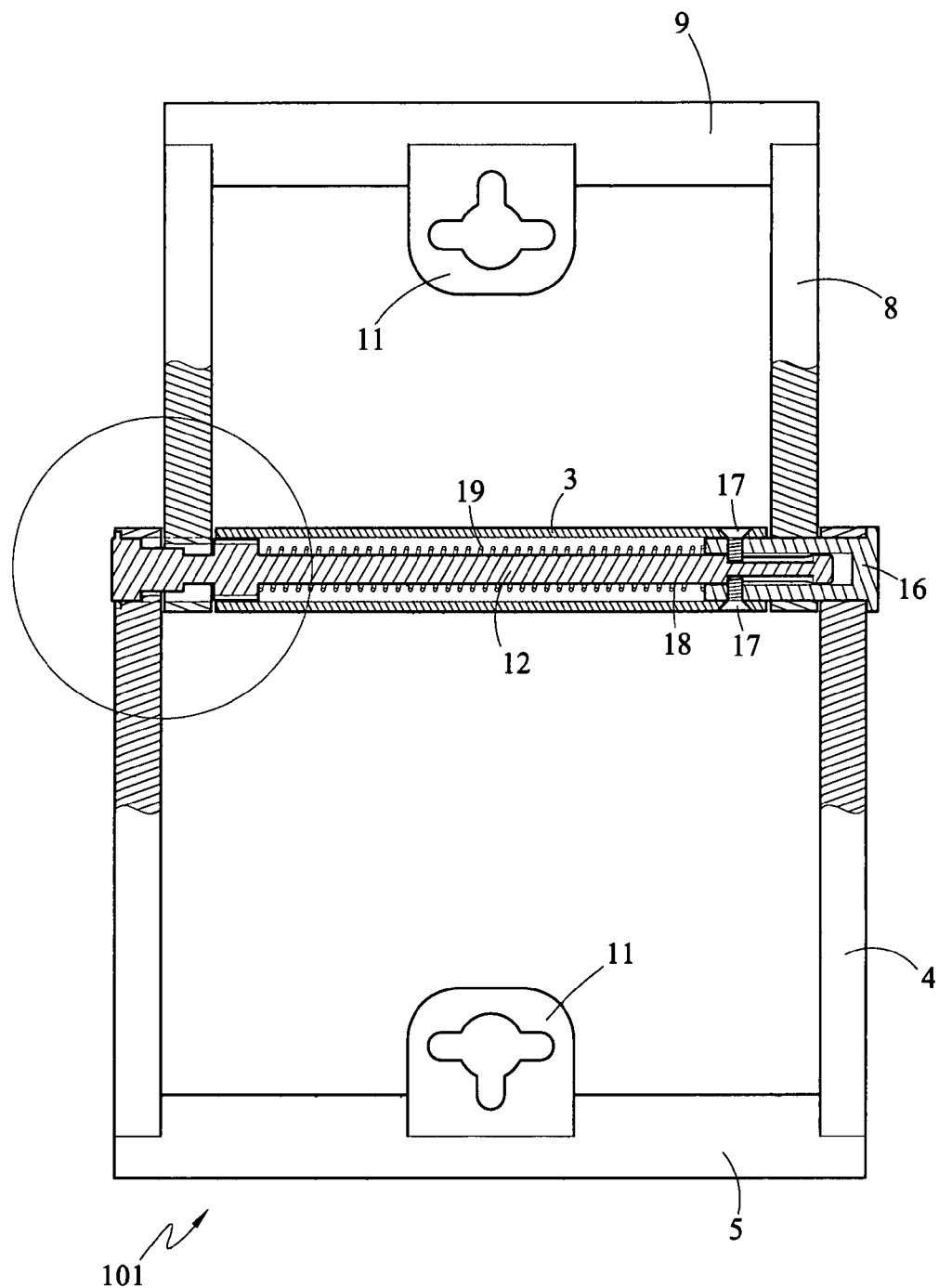
FIG. 5A is a sectional view of the adjustable stand of the present invention in a third state.
Figure 5B:
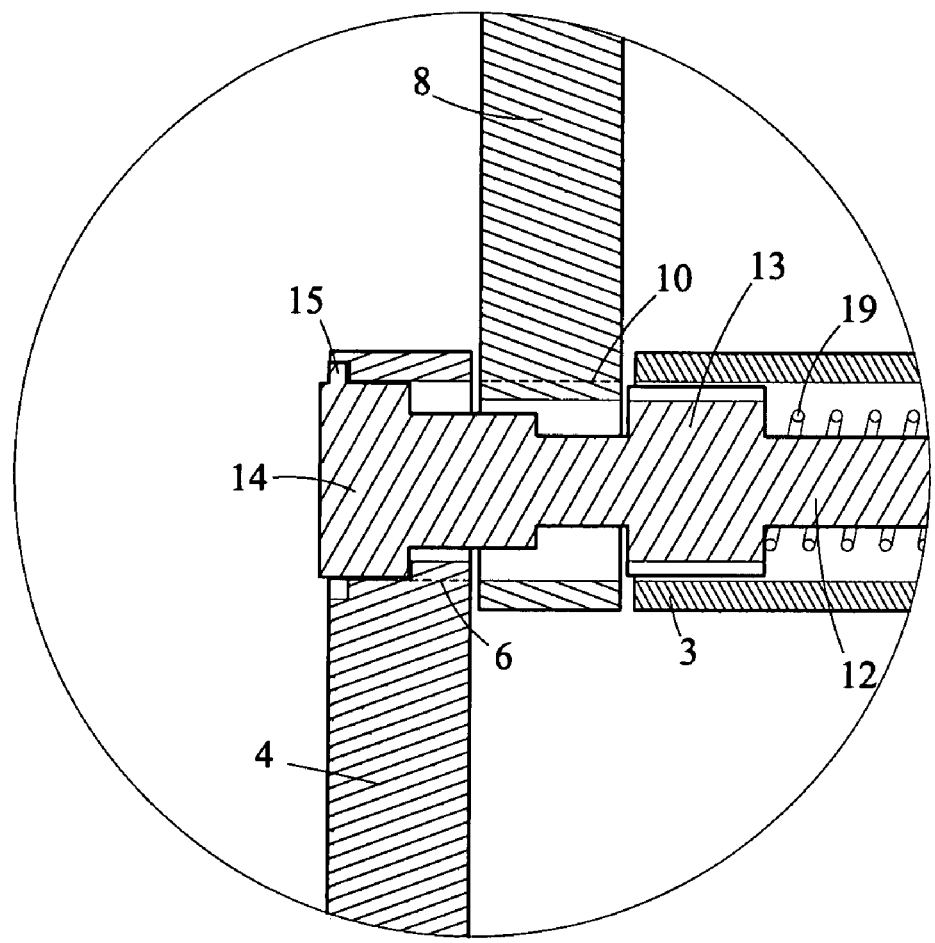
FIG. 5B is a detailed partial enlarged view of the adjustable stand of FIG. 5A.

FIG. 5A is a sectional view of a third state of the present invention. The pressing portion 14 is still endured the external force. At this time, the pivot 12 and the sliding slot 18 thereon continue to move towards the accommodation space of the sleeve 16 under the external force until the screw 17 urges the left-most end of the sliding slot 18. At this time, the pivot 12 cannot be further pushed. FIG. 5B is a schematic enlarged view of the relationship of relative positions of the pivot 12, the gear portion 13, the limiting bump 15, and the first convex tooth 6, the second convex tooth 10, and the limiting slot 7. When a force is exerted on the pressing portion 14, the pivot 12 moves horizontally, such that the gear portion 13 is disengaged from the second convex tooth 10, and the limiting bump 15 is inserted into the limiting slot 7. Thus, the first support frame 4 can be fixed, and the second support frame 8 can be rotated at the same time.

In the second and third states of the present invention, when the user releases the force exerted on the pressing portion 14, the pressing portion 14 can restore its original position automatically by the restoring characteristics of the spring 19, and restore the first state of the present invention.

Figure 6A:
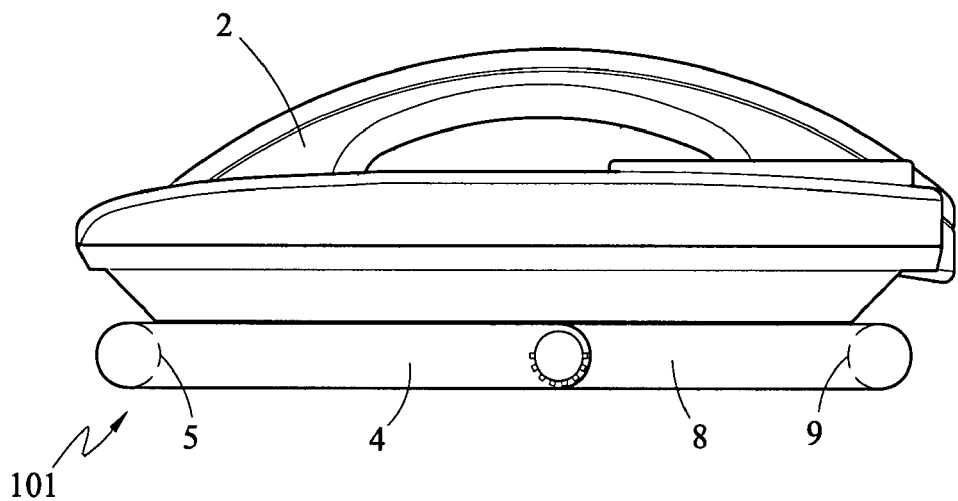
FIG. 6A is a schematic view of the adjustable stand of the present invention in an original state.
Figure 6B:
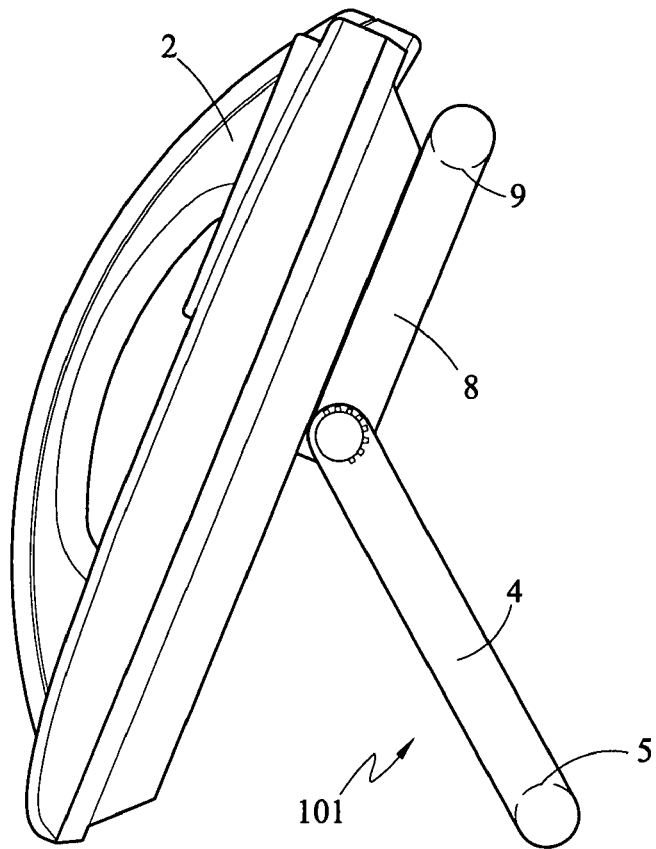
FIG. 6B is a schematic view of the adjustable stand of the present invention when the first support frame is adjusted to support.
Figure 6C:
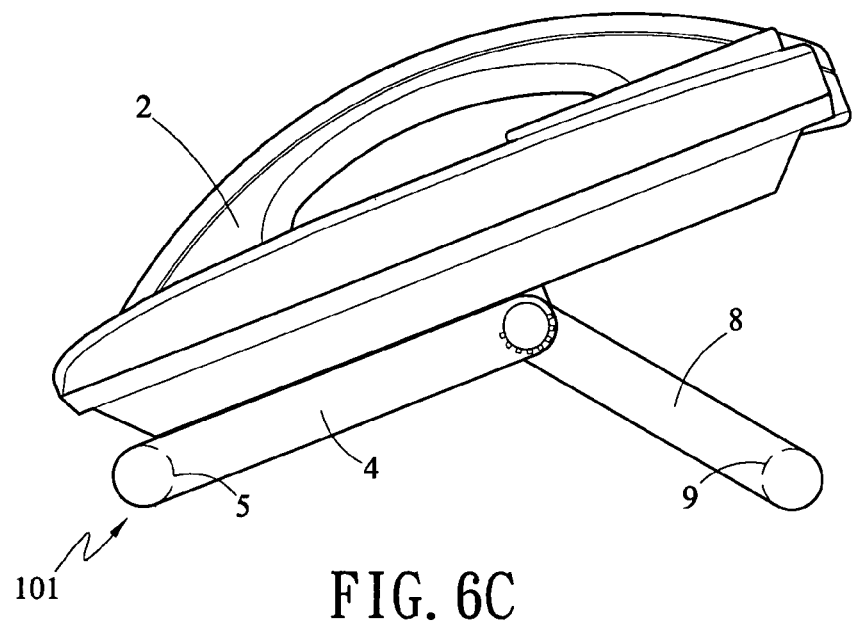
FIG. 6C is a schematic view of the adjustable stand of the present invention when the second support frame is adjusted to support.
Figure 6D:
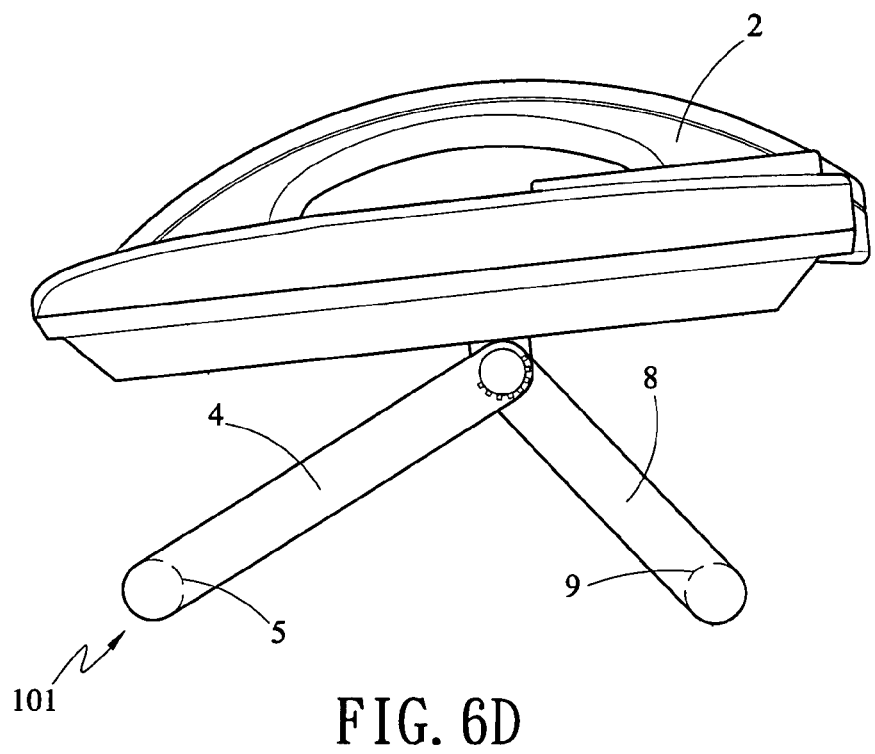
FIG. 6D is a schematic view of the adjustable stand of the present invention at the same time when both the first and the second support frames are adjusted to support.

FIG. 6A shows a first embodiment of the present invention while the adjustable stand 101 of the present invention is in the original state. FIG. 6B shows a second embodiment of the present invention while the adjustable stand 101 rotates about the first support frame 4 and supports the electronic device 2 with the first support portion 5 in the second state. FIG. 6C shows a third embodiment of the present invention while the adjustable stand 101 of the present invention rotates about the second support frame 8, and supports the electronic device 2 with the second support portion 9 in the third state. The fourth state of the adjustable stand 101 of the present invention integrates the second and the third states. FIG. 6D shows a fourth embodiment of the present invention, in which the first support frame 4 and the second support frame 8 are rotated and adjusted, and the first support portion 5 and the second support portion 9 are used at the same time to support the electronic device 2.

Figure 6E:
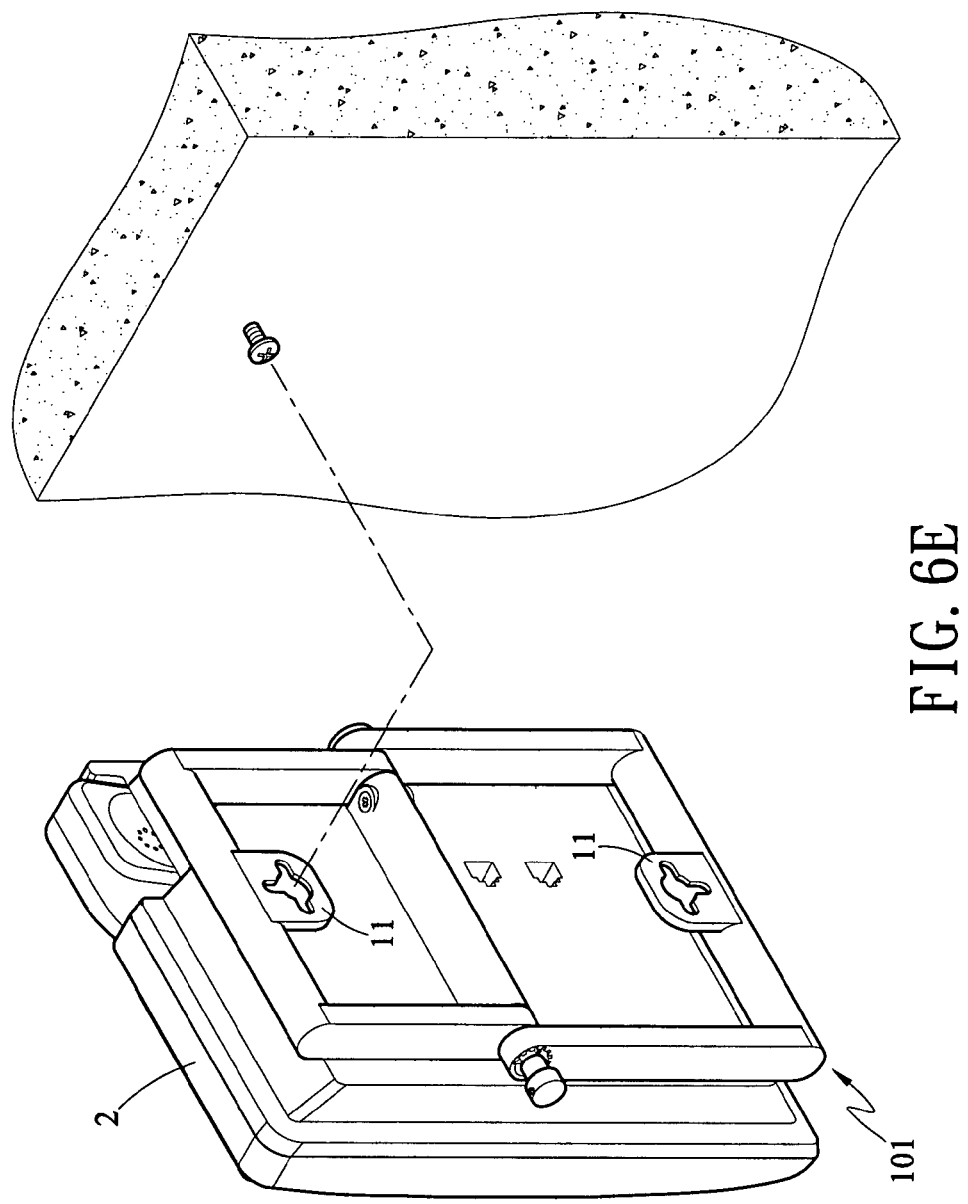
FIG. 6E is a schematic view of the adjustable stand of the present invention using a three-directional hook to be vertically hanging on a wall.

FIG. 6E and FIG. 6F show a fifth embodiment and a sixth embodiment of the present invention respectively, in which the present invention is hung in use. According to these two embodiments, the three-directional hook 11 of the adjustable stand 101 of the present invention is used to hang the electronic device on a wall vertically or transversely according to requirements of the user. The user can adjust the present invention for different hanging methods, so as to be adapted to different viewing angles when the present invention is hung in use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adjustable stand for electronic devices, comprising:
   a main body, having a hollow protrusion formed thereon, wherein holes are opened at two ends of the hollow protrusion respectively;
   a first support frame, having a first support portion formed on a top end thereof, wherein holes are opened in supporting surfaces extending from two sides of the first support portion, a first convex tooth is formed on an inner periphery of the hole at one end, and at least one limiting slot is disposed in an outer side of the first convex tooth;
   a second support frame, disposed opposite to the first support frame, having a second support portion formed on a top end thereof, wherein holes are opened in supporting surfaces extending from two sides of the second support portion, and a second convex tooth is formed on an inner periphery of the hole at the same end as the first support frame;

a pivot, having a gear portion formed at one end thereof, wherein the gear portion further extends outward to form a pressing portion, a limiting bump is formed on the pressing portion, and the other end of the pivot passes through the holes at one side of the first support frame, the second support frame, and the hollow protrusion, and is pivoted to the first support frame and the second support frame, when a force is exerted on the pressing portion, the gear portion and the limiting bump are driven to move between the first convex tooth and the second convex tooth movably and horizontally, when the limiting bump urges the limiting slot, the gear portion is disengaged from the first convex tooth and the second convex tooth; and a sleeve, inserted into the first support frame, the second support frame, and the hollow protrusion from the holes at the other side opposite to the pivot, and is pivoted to the first support frame and the second support frame.

2. The adjustable stand for electronic devices as claimed in claim 1, wherein the main body is disposed at a bottom of the electronic device.

3. The adjustable stand for electronic devices as claimed in claim 1, wherein the first support frame and the second support frame each adopts a design of a hollow frame.

4. The adjustable stand for electronic devices as claimed in claim 1, wherein the first support portion or the second support portion or both comprises a three-directional hook for hanging the electronic device.

5. The adjustable stand for electronic devices as claimed in claim 1, wherein the sleeve is fixed to the hollow protrusion by screw fastening.

6. The adjustable stand for electronic devices as claimed in claim 1, wherein the pivot further comprises a sliding slot at the other end thereof, the sliding slot is limited by a screw, when a force is exerted on the pressing portion, the sliding slot moves relative to the screw, so as to limiting a horizontal movement range of the pivot.

7. The adjustable stand for electronic devices as claimed in claim 1, wherein a spring is sleeved on the pivot, when the force exerted on the pressing portion is released, the pivot restore an original position automatically by a restoring force of the spring.

* * * * *